US005594757A

United States Patent [19]
Rohani

[11] Patent Number: 5,594,757
[45] Date of Patent: Jan. 14, 1997

[54] METHOD AND APPARATUS FOR DIGITAL AUTOMATIC FREQUENCY CONTROL

[75] Inventor: Kamyar Rohani, Ft. Worth, Tex.

[73] Assignee: Motorola, Inc., Schaumburg, Ill.

[21] Appl. No.: 281,945

[22] Filed: Jul. 28, 1994

[51] Int. Cl.⁶ .................................................. H04L 27/06
[52] U.S. Cl. ........................... 375/344; 332/126; 455/136
[58] Field of Search ..................................... 375/344, 340, 375/341, 342, 343, 346, 348, 349, 350; 455/164.1, 192.2, 75, 136, 164.1, 173.1; 331/1 R; 332/126, 127; 334/13, 16, 26; 342/199; 348/536, 735; 363/165

[56] References Cited

U.S. PATENT DOCUMENTS

| | | | |
|---|---|---|---|
| 5,107,522 | 4/1992 | Kitayama et al. | 375/344 |
| 5,233,633 | 8/1993 | Baum et al. | 375/344 |
| 5,311,545 | 5/1994 | Critchlow | 375/344 X |
| 5,341,402 | 8/1994 | Matsushita et al. | 375/344 |

OTHER PUBLICATIONS

Nelson Sollenberger and Justin Chuang, "Low-Overhead Symbol Timing and Carrier Recovery for TDMA Protable Radio Systems", IEEE Transactions on Communications, vol. 38, No. 10, Oct. 1990, pp. 1886–1892.

Primary Examiner—Tesfaldet Bocure
Assistant Examiner—Bryan Webster
Attorney, Agent, or Firm—Raymond J. Warren

[57] ABSTRACT

A method and apparatus for digital automatic frequency control includes circuitry for frequency controlling a first information portion of a digital input signal, correlating the output with a known characteristic of the first information portion, and outputting a timing signal and channel estimation signal. The digital input signal is also decimated using the timing signal and frequency controlled into a frequency controlled output signal. This signal is used, along with a signal quality estimate derived from the channel estimation signal and first information portion, to determine an estimated frequency correction signal. The estimated frequency correction signal is used to control the frequency correction steps.

19 Claims, 3 Drawing Sheets

METHOD AND APPARATUS FOR DIGITAL AUTOMATIC FREQUENCY CONTROL

FIELD OF THE INVENTION

The present invention relates generally to frequency control and more particularly to a system for automatic frequency control of a digital signal.

BACKGROUND OF THE INVENTION

Automatic frequency controls (AFCs) are well known, and have been used in a wide variety of applications. In conventional applications, an AFC functions by adjusting a system variable control oscillator (VCO) based on the detected input signal frequency (e.g., by detecting the peak value following bandpass filtering). Even in applications using digital input signals it is common to rely partially upon analog circuitry to implement an AFC. Thus, one may typically find digital AFCs implemented with an analog VCO preceded by a DAC (digital to analog converter).

A problem with such conventional AFCs is their reliance on analog circuitry in the feedback loop. Where the AFC is used with digital signaling, the analog components add both size and cost to the AFC, and limits the full processing capabilities achieved by an all digital implementation. In other words, an all digital implementation will typically yield both higher accuracy and speed than one relying on analog circuitry.

One possible solution for an all digital implementation in the field of communications, described in N. Sollenberger, Low-Overhead Symbol Timing and Carrier Recovery for TDMA Portable Radio Systems, IEEE Transactions on Communications, October 1990. This proposed digital AFC provides for a one symbol delay from the output of a differential demodulator for received coherent symbols, and has a frequency offset estimator using differential phase error magnitudes from the differential constellation points accumulated on a per symbol basis, along with a symbol timing estimate, to output an offset estimate to feedforward first-order carrier recovery loop. However, a major drawback with this AFC is its requirement of a relatively high C/I (carrier to interference) ratio, as much as 17 to 25 dB in Rayliegh fading, and it relies on a solely data driven approach (i.e., it assumes no knowledge of the data being communicated). In many communications environments, such as digital cellular radiotelephony, requiring a 17 dB would lead to unacceptable frequency drift since the communications systems are designed to operate at much lower C/Is, sometimes as low as 3 dB.

There remains therefore a need for an improved digital AFC that overcomes these problems.

DETAILED DESCRIPTION OF THE EMBODIMENTS

Figure 1:
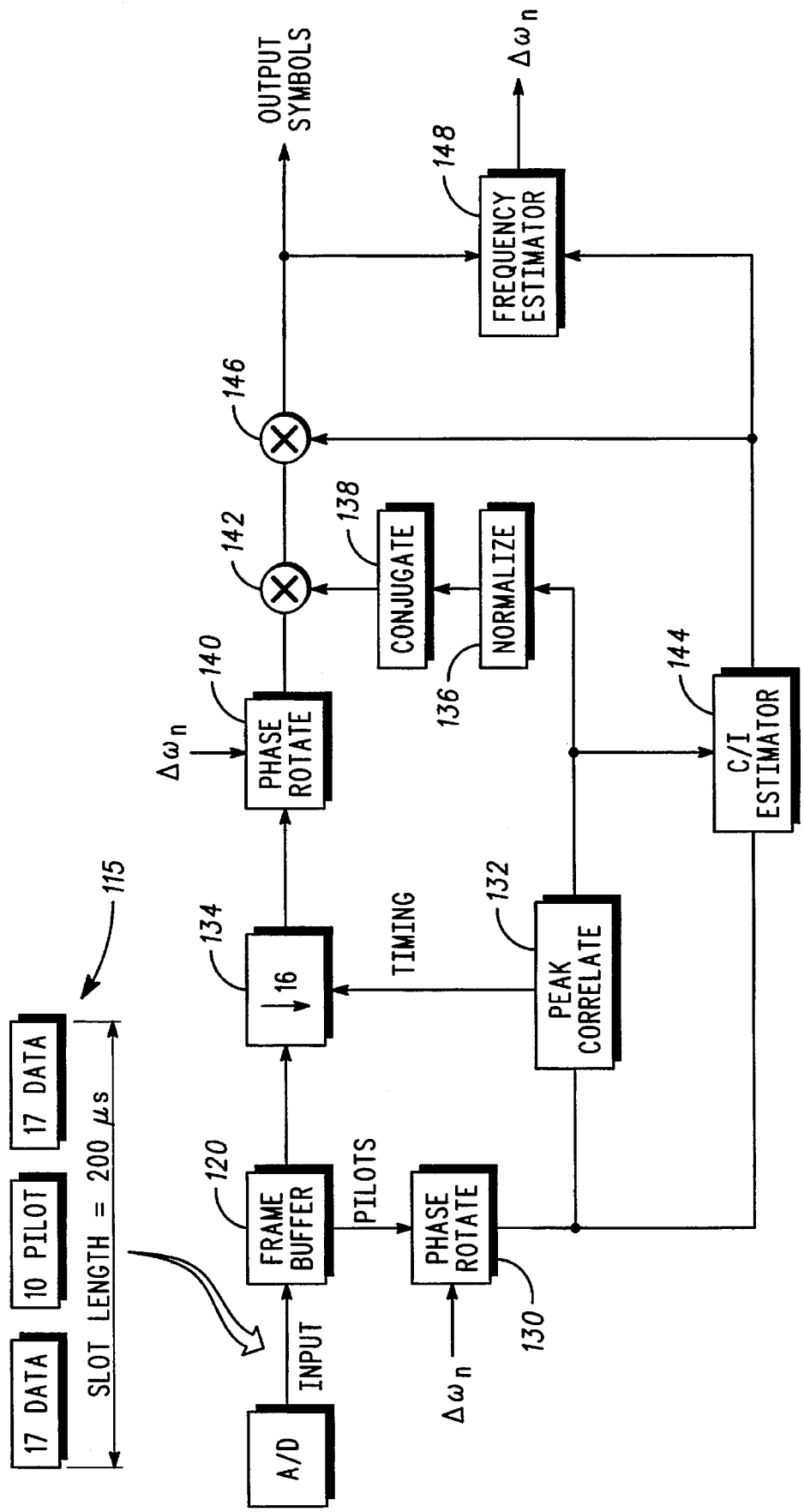
FIG. 1 is a block diagram of a digital AFC according to a first embodiment of the invention.

These problems and others are met with a method and apparatus for digital automatic frequency control according to the present invention. FIG. 1 shows a block diagram of a digital AFC according to a first embodiment for use in a cellular radiotelephone receiver. It should be understood, however, that the invention has application to other types of systems, including but not limited to other communication systems (computer, broadcast radio, television, etc.), control devices, and other digital electronic devices using frequency control. The following description, of a presently preferred embodiment for one type a cellular system, is thus meant for illustration and not limitation on the scope of the invention.

In FIG. 1 a received digital signal 115 is input to a buffer 120. Signal 115 has earlier been digitized by an A/D (analog to digital) converter (not shown), and is shown as a typical TDMA (time division multiple access) time slot. In this first embodiment, the TDMA slot has a mid-amble pilot signal of 10 symbols, with 17 data symbols preceding and following the mid-amble. Because the pilot signal is in the mid-amble, as opposed to a preamble, position a buffer 120 is used to buffer the received signal while the pilot symbols are being processed by the AFC. This buffer is not essential, particularly where the pilot signal is in the preamble position, as illustrated by the second embodiment in FIG. 4.

The pilot symbols are inputted to a peak correlator 132 and signal quality (C/I) estimator 144 via frequency controller/adjuster 130. On initialization, where there is no prior phase information, frequency adjuster 130 leaves the pilot signal information unchanged. Otherwise, the frequency adjuster 130 takes frequency change information from frequency estimator 148, which is described in more detail below. Each frequency-adjusted pilot symbol is still an oversampled bitstream, the embodiment of FIG. 1 showing a 16 times oversampling. The frequency-adjusted pilot symbol information is then correlated in peak correlator 132, using known information about the pilot signal, to obtain peak timing information, and output that information to decimator 134. Decimator 134 receives from buffer 120 the original input signal bitstream (data and pilot symbols) along with the timing information from peak correlator 132, and decimates the bitstream in order to output a decimated or downsampled signal at timing corresponding to that of the pilot symbol peaks.

Peak correlator 132 is also adapted to output channel estimate information to C/I estimator 144. C/I estimator 144 receives both the frequency-adjusted pilot signal (having both C and I information) and the channel estimate information and outputs an estimate of signal quality, or in other words a weighted C/I information signal. The channel estimate information is also normalized and conjugated in circuitry 136, 138 and applied to the frequency-adjusted, decimated signal via multiplier 142, to output a phase-adjusted signal. This signal is further adjusted by multiplying it with the estimated C/I information at multiplier 146 to yield a weighted signal output.

The weighted signal is then input to frequency estimator 148, along with the estimated C/I from C/I estimator 144. The frequency estimator 148 extracts each received pilot symbol $r_n$ received at time n, and processes the received pilots by conjugating $(x_n = r_n r^*_{n-1})$ and normalizing $(s_n = (x_n / |x_n|))$ them into received pilot vector $S = [s_1 s_2 \ldots s_n]$. Similarly, frequency estimator 148 processes the known transmitted pilot symbols $p_n$, corresponding to received pilot symbols $r_n$, into known pilot vector $Y = [y_1 y_2 \ldots y_n]$, where $y_n = p_n p^*_{n-1}$. These two vectors are then processed to derive the estimated frequency correction $\Delta\omega_t$ as follows:

$$\sin(\Delta\theta) = (1/N-1) \, \text{Imag}(S \cdot Y^{*T}) \approx \Delta\theta;$$

$$\Delta\theta = \Delta\omega T;$$

and $$\Delta\omega_t = \Delta\omega_{t-1} + \mu \cdot \eta \cdot \Delta\theta,$$

where $\eta$ is the estimated C/I per slot (or hop in a slow frequency hopping system) and $\mu$ is a constant for controlling the adaptation rate. It has also been assumed that the symbol to symbol rotation in constellation is small, such that $\sin(\Delta\theta)$ can be approximated with $\Delta\theta$. For example, a 9 KHz frequency offset (i.e., 5 ppm (parts per million) at 1.8 GHz) corresponds to about a 13 degree shift between adjacent symbols (assuming a symbol rate of 250 Ksymbols per second), which satisfies the above condition.

The processed $\Delta\omega_n$ then becomes the next $\Delta\omega_{n-1}$ and applied to frequency adjusters 130 and 134. For a given data vector $r = [r_1 r_2 \ldots r_m]$ of size M, the phase rotation performed by frequency adjusters 130 and 134 is $$\Delta\theta = \Delta\theta_0 \Delta\theta_1 \ldots \Delta\theta_{M-1}]$$

$$= [-(M/2)\Delta\omega \; -((M/2)-1)\Delta\omega \ldots 0 \ldots (M/2)\Delta\omega]$$

$$r' = [r_0 e^{\Delta\theta_0} \; r_1 e^{\Delta\theta_1} \ldots r_{M-1} e^{\Delta\theta_{M-1}}]$$

where r' denotes the phase rotated vector. It should also be noted that the phase rotation is referenced to the middle symbol (center of the pilot vector) in the above equations.

Figure 2:
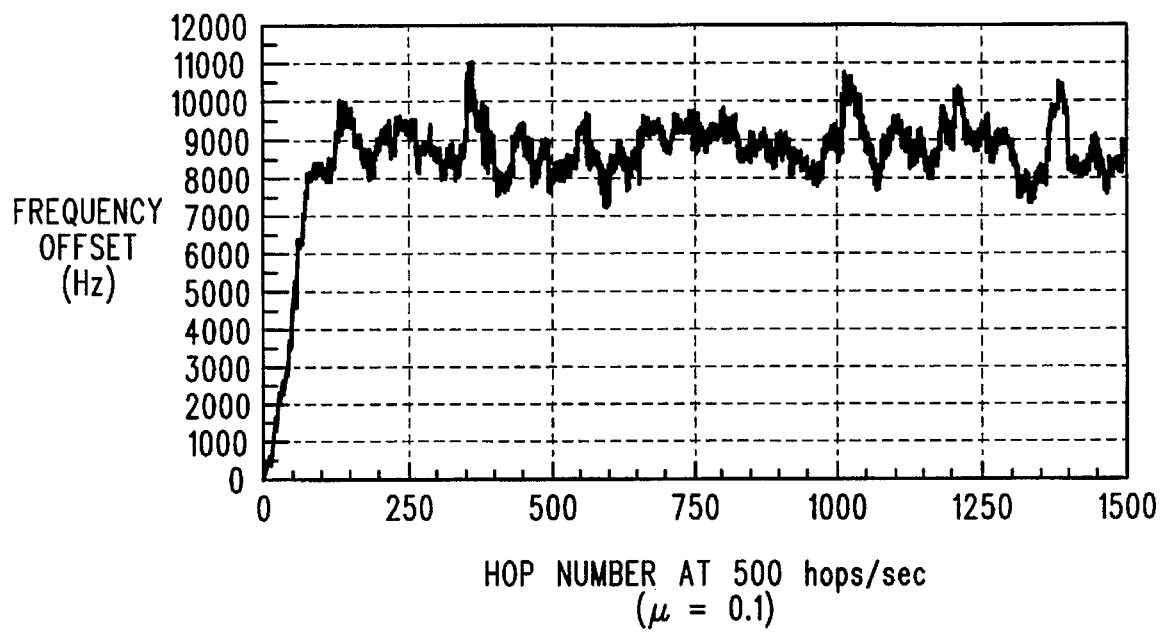
FIG. 2 is a graph illustrating frequency control performance of a digital AFC according to FIG. 1 using a first constant μ.
Figure 3:
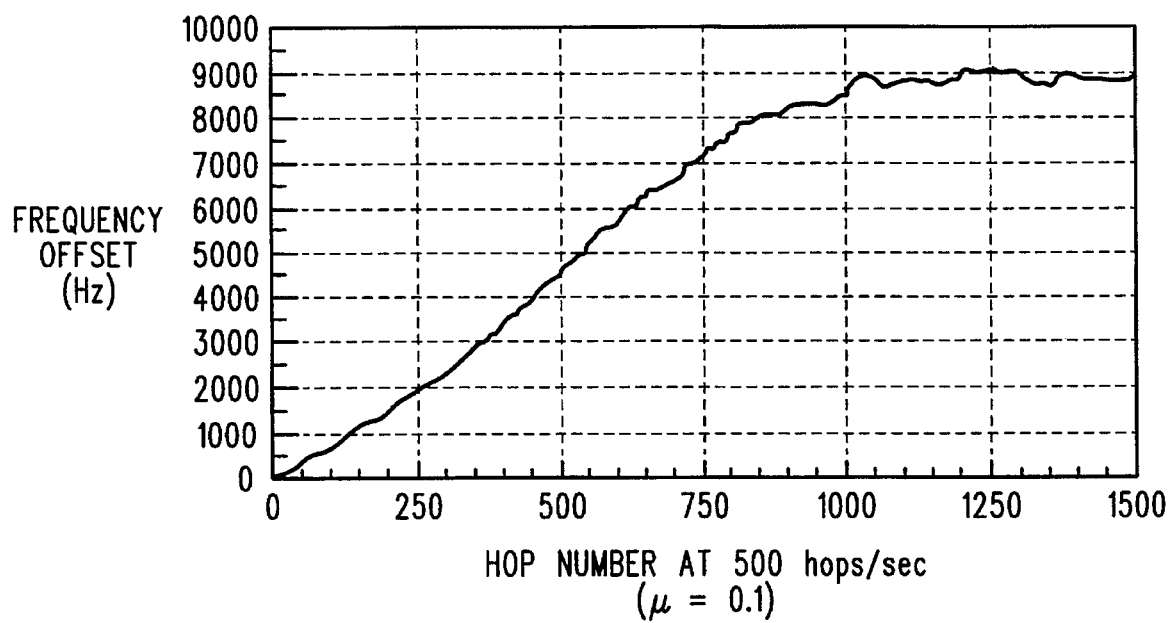
FIG. 3 is a graph illustrating frequency control performance of a digital AFC according to FIG. 1 using a second constant μ.

Turning to FIGS. 2 and 3, the variation in the step response of a system is illustrated for different values of $\mu$. FIG. 2 illustrates the step response for $\mu=1$, assuming 500 Hops (or time slots) per second, C/I of 4 dB, and a transmitting unit traveling at 97 kilometers per hour. FIG. 3 illustrates the step response for the same conditions except for a reduced $\mu=0.1$. Thus, it is clear that the larger the value of $\mu$ used, the faster the response time will be. On the other hand, there will also be a substantially increased jitter in the frequency offset at a higher $\mu$. Consequently, it is presently preferred to use a larger $\mu$ on starting up the system for a faster step response, and then switch to smaller values to establish a more constant frequency offset.

Figure 4:
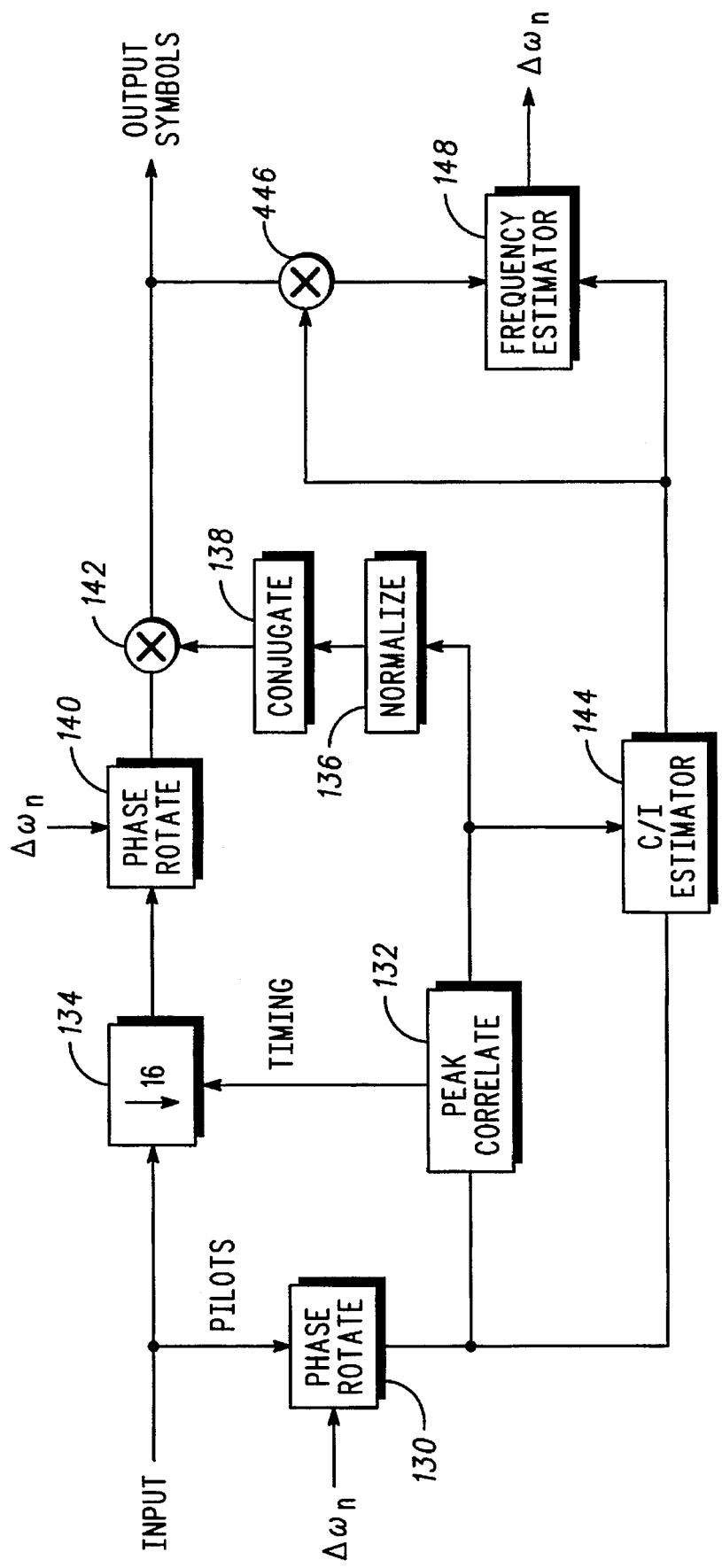
FIG. 4 is a block diagram of a digital AFC according to a second embodiment of the invention.

FIG. 4 shows an AFC according to a second embodiment of the invention. In this AFC the circuitry has remained substantially the same, with similar elements retaining the same numbering as in FIG. 1. Where this AFC differs from that of FIG. 1 is the removal of frame buffer 120, and replacement of multiplier 146 with multiplier 446 on the input line to frequency estimator 148. As noted above, frame buffer 120 may be omitted when the pilot signal is found in a preamble position in the time slot. Further, while it is considered advantageous in many applications to weight the frequency and phase corrected data stream output, where a weighted output is not desired one may do the weighting via a multiplier 446 on the input to frequency estimator 148.

The invention has thus been described with reference to illustrative embodiments thereof. It will be apparent to one skilled in the art that various modifications and changes can be made without departing frown the spirit and the scope of the invention. For example, the invention is not limited to systems using TDMA signals, as any signal having a known information portion may be used in correcting other data portions. Rather, the spirit and scope of the invention should be understood in view of the claims below.

We claims:

1. A digital Automatic Frequency Control (AFC) having an AFC input for receiving a first digital signal, comprising:
   (a) first frequency control means, operatively coupled to the AFC input, for automatic frequency controlling at least a predetermined information portion of the first digital signal and outputting a first frequency controlled signal;
   (b) correlation means, operatively coupled to first frequency control means, for correlating a characteristic of the predetermined information portion with a known characteristic of the predetermined information portion and outputting a timing information signal and channel estimation signal;
   (c) decimation means, operatively coupled to the AFC input and the correlation means, for receiving the timing information signal and decimating the first digital signal based on the timing information signal, and outputting a first decimated signal;
   (d) second frequency control means, operatively coupled to the decimation means, for automatic frequency controlling the first decimated signal and outputting a frequency controlled output signal;
   (e) signal quality estimation means, operatively coupled to the first frequency control means and the correlation means, for receiving the first frequency controlled signal and the channel estimation signal and determining an estimated signal quality; and
   (f) frequency estimation means, operatively coupled to the second frequency control means and signal quality estimation means for receiving the estimated signal quality and the frequency controlled output signal and for determining an estimated frequency correction signal, and having an output operatively coupled to the first and second frequency control means, wherein the first and second frequency control means automatic frequency control the at least a predetermined information portion of the first digital signal and the first decimated signal, respectively, based on the estimated frequency correction signal.

2. The digital AFC of claim 1 further comprising:
   (g) buffer means, operatively coupled between the AFC input and the first frequency control means and decimation means, for buffering the first digital signal before outputting the predetermined information portion to the first frequency control means.

3. The digital AFC of claim 1 further comprising:
   (g) phase correction means, operatively coupled to the correlation means for receiving the channel estimation signal, and coupled between the second frequency control means and frequency estimation means for phase correcting the frequency controlled output signal.

4. The digital AFC of claim 3 further comprising:
   (h) weighting means, operatively coupled between the phase correction means and the frequency estimation means, and operatively coupled to the signal quality estimation means for receiving the estimated signal quality, weighting the phase corrected output signal, and outputting a weighted and phase corrected frequency controlled output signal to the frequency estimation means.

5. The digital AFC of claim 4 wherein the first digital signal is a framed signal and the predetermined information portion is a periodically repeating pilot signal having a known frequency, further comprising:
   (i) buffer means, operatively coupled between the AFC input and the first frequency control means and decimation means, for buffering a first frame of the framed signal containing a first pilot portion of the repeating pilot signal, and first outputting the first pilot portion to the first frequency control means and at a predetermined subsequent time outputting the first frame to the decimation means.

6. The digital AFC of claim 4 wherein the correlation means is a peak correlator and the signal quality estimation means is a carrier-to-interference estimator.

7. The digital AFC of claim 4 wherein the first and second frequency control means are operable for rotating a phase of the at least a predetermined information portion of the first digital signal and the first decimated signal, respectively.

8. The digital AFC of claim 4 wherein the first frequency control means, correlation means decimation means, second frequency control means, signal quality estimation means, frequency estimation means, phase correction means, and weighting means are operatively coupled circuitry of a processor.

9. A digital AFC having an AFC input for receiving a first digital signal, comprising:
(a) a digital first frequency controller operatively coupled to the AFC input, and adapted for automatic frequency controlling at least a predetermined information portion of the first digital signal and outputting a first frequency controlled signal;
(b) a digital correlator operatively coupled to the first frequency controller, and adapted for correlating a characteristic of the predetermined information portion with a known characteristic of the predetermined information portion, and having a timing information signal output and a channel estimation signal output;
(c) a digital decimator operatively coupled to the AFC input and the timing information signal output of the correlator, adapted for decimating the first digital signal;
(d) a digital second frequency controller operatively coupled to the decimator, adapted for automatic frequency controlling the decimated first digital signal, and having a second frequency controlled signal output;
(e) a digital signal quality estimator operatively coupled to the first frequency controller and the channel estimation signal output of the correlator, adapted for determining an estimated signal quality; and
(f) a digital frequency correction estimator operatively coupled to the second frequency controller and signal quality estimator, and having an estimated frequency correction signal output operatively coupled to the first and second frequency controllers, wherein the first and second frequency controllers are adapted for automatic frequency controlling the at least a predetermined information portion of the first digital signal and the decimated first digital signal, respectively.

10. The digital AFC of claim 9 further comprising:
(g) a digital phase corrector operatively coupled to the channel estimation signal output of the correlator and further operatively coupled between the second frequency controlled output of the second frequency controller and the frequency correction estimator.

11. The digital AFC of claim 10 further comprising:
(h) a weighting,, multiplier operatively coupled between the phase corrector and the frequency correction estimator, and further operatively coupled to the signal quality estimator, adapted for weighting phase corrector output signals by signal quality estimator output signals.

12. The digital AFC of claim 11 wherein the first digital signal is a framed signal and the predetermined information portion is a periodically repeating pilot signal having a known frequency, further comprising:
(i) a buffer operatively coupled between the AFC input and the first frequency controller and decimator, and adapted for buffering a first frame of the framed signal containing a first pilot portion of the repeating pilot signal, and outputting the first pilot portion to the first frequency controller and outputting the first frame to the decimator.

13. A method of digital automatic frequency controlling a first digital signal, comprising:
(a) automatic frequency controlling an at least a predetermined information portion of the first digital signal into a first frequency controlled signal;
(b) correlating a characteristic of the predetermined information portion with a known characteristic of the predetermined information portion and outputting a timing information signal and channel estimation signal;
(c) decimating the first digital signal based on the timing information signal, and outputting a first decimated signal;
(d) further automatic frequency controlling the first decimated signal into a frequency controlled output signal;
(e) determining an estimated signal quality based on the first frequency controlled signal and the channel estimation signal; and
(f) determining an estimated frequency correction signal based on the estimated signal quality and the frequency controlled output signal.

14. The method of claim 13 wherein when steps (a) through (f) are repeated, the steps of automatic frequency controlling and further automatic frequency controlling are based on the estimated frequency correction signal.

15. The method of claim 14 further comprising:
(g) phase correcting the frequency controlled output signal.

16. The method of claim 14 further comprising:
(g) phase correcting the frequency controlled output signal by normalizing the channel estimation signal, conjugating the normalized channel estimation signal, and multiplying the frequency controlled output signal by the conjugated and normalized channel estimation signal.

17. The method of claim 14 further comprising:
(g) phase correcting the frequency controlled output signal;
(h) weighting the phase corrected frequency controlled output signal and outputting a weighted output signal, such that step (f) is determined based on the weighted output signal and the estimated signal quality.

18. The method of claim 17 wherein the first digital signal is a framed signal and the predetermined information portion is a periodically repeating pilot signal having a known frequency, further comprising:
(i) buffering a first frame of the framed signal containing a first pilot portion of the repeating pilot signal, and first outputting the first pilot portion for use in determining the first frequency controlled signal in step (a) and subsequently outputting the first frame for decimation in step (c).

19. The method of claim 18 wherein:
step (b) comprises peak correlating the first pilot portion from known pilot signal characteristics;

step (e) comprises estimating a carrier to interference (C/I) value for the first pilot portion; and steps (a) and (d) function to frequency control by phase rotating the first pilot portion and decimated first frame, respectively, using the estimated frequency correction signal.

* * * * *

UNITED STATES PATENT AND TRADEMARK OFFICE
CERTIFICATE OF CORRECTION

PATENT NO. : 5,594,757
DATED : January 14, 1997
INVENTOR(S) : Rohani, Kamyar

It is certified that error appears in the above-indentified patent and that said Letters Patent is hereby corrected as shown below:

Column 5, line 62 reads "weighting,, multiplier" should be -- weighting multiplier,--.

Signed and Sealed this

Twenty-fourth Day of June, 1997

Attest:

BRUCE LEHMAN

Attesting Officer     Commissioner of Patents and Trademarks